United States Patent
Dornfeld et al.

(10) Patent No.: US 8,465,373 B2
(45) Date of Patent: Jun. 18, 2013

(54) FACE COUPLING

(75) Inventors: Michael S. Dornfeld, Avon, IN (US); Douglas Michael Roever, Indianapolis, IN (US); Mark Potter, Carmel, IN (US); Gregory Blake, Moblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 173 days.

(21) Appl. No.: 12/889,029

(22) Filed: Sep. 23, 2010

(65) Prior Publication Data

US 2011/0158744 A1 Jun. 30, 2011

Related U.S. Application Data

(60) Provisional application No. 61/290,811, filed on Dec. 29, 2009.

(51) Int. Cl.
*F16D 3/18* (2006.01)
(52) U.S. Cl.
USPC ........................................ 464/157; 403/359.2
(58) Field of Classification Search
USPC ............ 464/149, 157; 403/298, 359.2, 359.6, 403/364; 415/124.2
See application file for complete search history.

(56) References Cited

U.S. PATENT DOCUMENTS

| | | | |
|---|---|---|---|
| 3,447,822 A | 6/1969 | King | |
| 3,537,558 A | 11/1970 | Bibbens | |
| 4,185,511 A | 1/1980 | Blackburn et al. | |
| 5,536,144 A | 7/1996 | Bednarz et al. | |
| 5,730,657 A | 3/1998 | Olgren | |
| 6,364,634 B1 | 4/2002 | Svihla et al. | |
| 6,575,703 B2 | 6/2003 | Simeone et al. | |
| 6,587,741 B1 | 7/2003 | Chetta et al. | |
| 6,672,966 B2 | 1/2004 | Muju et al. | |
| 7,052,379 B2 | 5/2006 | Burgess | |
| 7,309,210 B2 * | 12/2007 | Suciu et al. | |
| 2002/0034926 A1 | 3/2002 | Yasuie et al. | |
| 2003/0017878 A1 | 1/2003 | Muju et al. | |
| 2005/0132706 A1 | 6/2005 | Fukutani et al. | |
| 2006/0130456 A1 | 6/2006 | Suciu et al. | |

FOREIGN PATENT DOCUMENTS

| | | | |
|---|---|---|---|
| AT | 191204 | * 8/1957 | |
| AT | 191204 B | * 8/1957 | ................... 464/157 |

OTHER PUBLICATIONS

International Search Report and Written Opinion, PCT/US10/62374, Rolls-Royce Corporation, Mar. 29, 2011.

* cited by examiner

*Primary Examiner* — Gregory Binda
(74) *Attorney, Agent, or Firm* — Krieg DeValult LLP

(57) ABSTRACT

The present invention contemplates a face coupling, and contemplates a gas turbine engine having a face coupling. The face coupling includes a plurality of driving teeth extending from a first component, and a plurality of driven teeth extending from a second component. The plurality of driving teeth and the plurality of driven teeth cooperate to transmit a torque load from the first component to second component. The plurality of driven teeth include a root transition for preventing a driving tooth tip edge from contacting an adjacent driven tooth.

20 Claims, 3 Drawing Sheets

FACE COUPLING

CROSS REFERENCE TO RELATED APPLICATIONS

The present application claims the benefit of U.S. Provisional Patent Application 61/290,811, filed Dec. 29, 2009, and is incorporated herein by reference.

GOVERNMENT RIGHTS

The present application was made with the United States government support under Contract No. N00019-02-C-3003 awarded by the United States Navy. The United States government may have certain rights in the present application.

FIELD OF THE INVENTION

The present invention relates to couplings, and in particular, face couplings, such as may be used in gas turbine engine systems.

BACKGROUND

Couplings, such as face couplings used in gas turbine engines, remain an area of interest. Some existing systems have various shortcomings, drawbacks, and disadvantages relative to certain applications. Accordingly, there remains a need for further contributions in this area of technology.

SUMMARY

One embodiment of the present invention is a gas turbine engine. Another embodiment is a face coupling. Other embodiments include apparatuses, systems, devices, hardware, methods, and combinations for face couplings. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
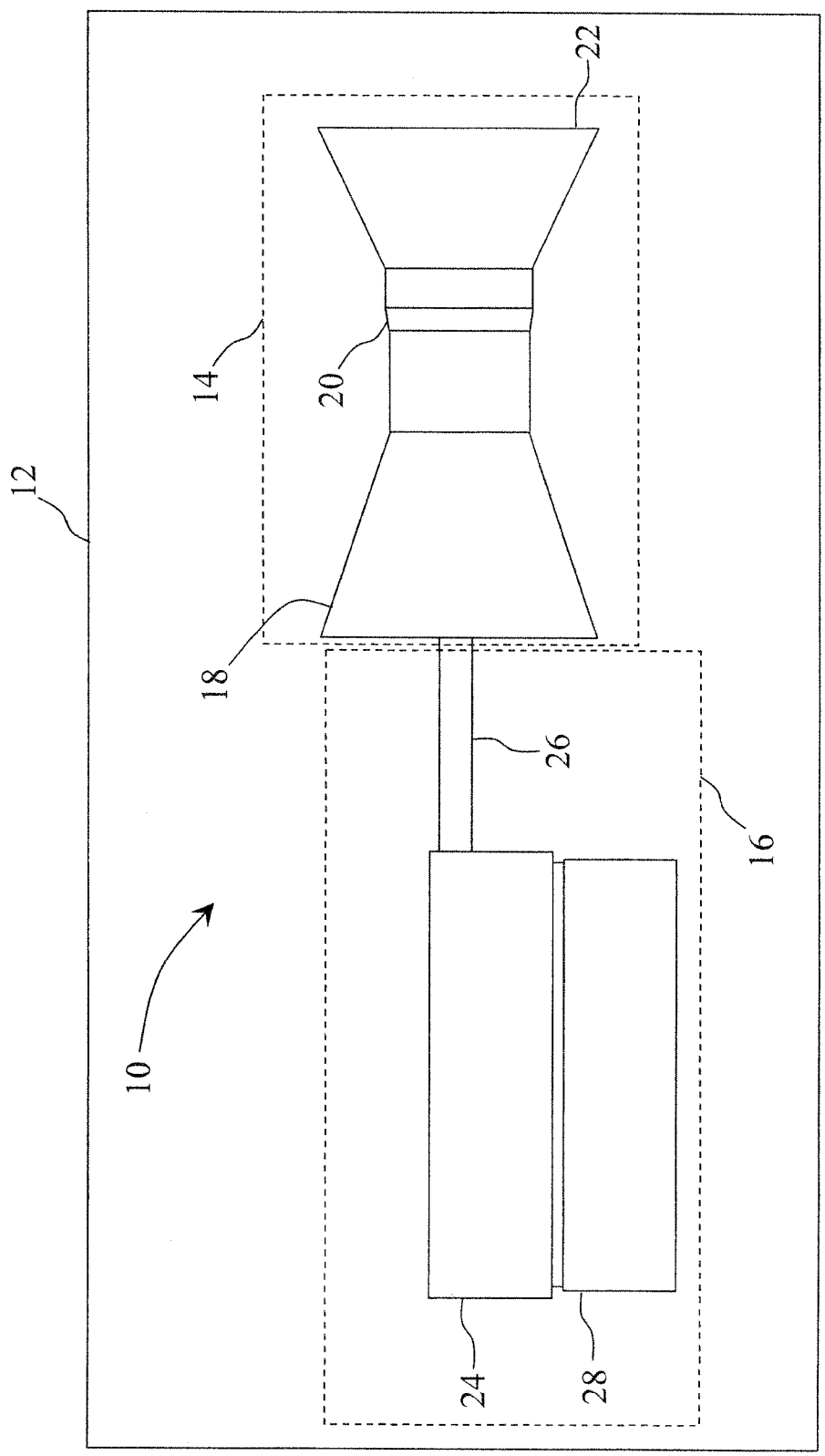
FIG. 1 schematically depicts a lift engine system in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to FIG. 1, there is illustrated a generic representation of a lift engine system 10 for powering an aircraft 12, such as a short takeoff and vertical landing (STOVL) aircraft. The non-limiting depiction of lift engine system 10 includes a gas turbine engine 14 and a lift fan system 16. Gas turbine engine 14 includes a compressor section 18, a combustor section 20 and a turbine section 22. Lift fan system 16 includes a lift fan 24, a shaft system 26, and a lift thrust output system in the form of a vanebox 28. Lift fan 24 is coupled to gas turbine engine 14 via shaft system 26.

Compressor section 18 compresses air received at the inlet of gas turbine engine 14, and may include one or more fan stages. Turbine section 22 is drivingly coupled to compressor section 18 via one or more shafts, and provides power to operate compressor section 18 and lift fan 24. Turbine section 22 may also be configured to provide power for other components (not shown). Power is supplied from gas turbine engine 14 to lift fan 24 via shaft system 26. Lift fan 24 is adapted for mounting to aircraft 12, and discharges air through vanebox 28 to provide thrust e.g., for STOVL aircraft 12.

Figure 2:
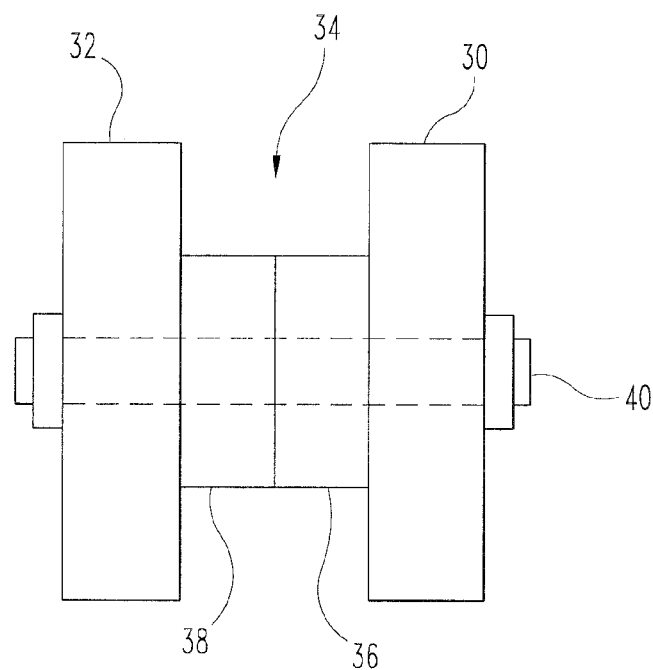
FIG. 2 schematically depicts a face coupling in accordance with an embodiment of the present invention.
Figure 3:
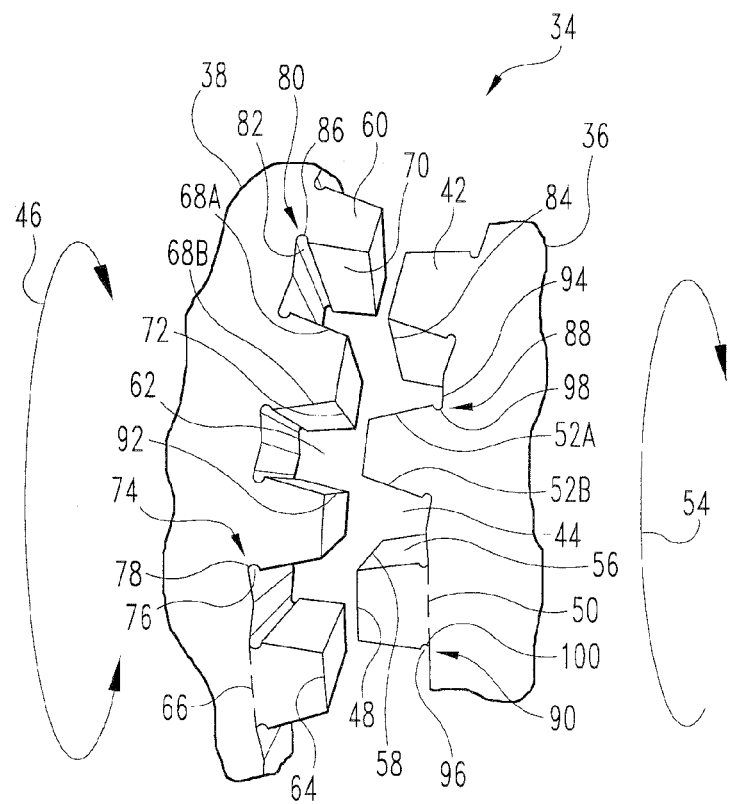
FIG. 3 depicts a driving side and a driven side of a face coupling having root transitions in accordance with an embodiment of the present invention.
Figure 4:
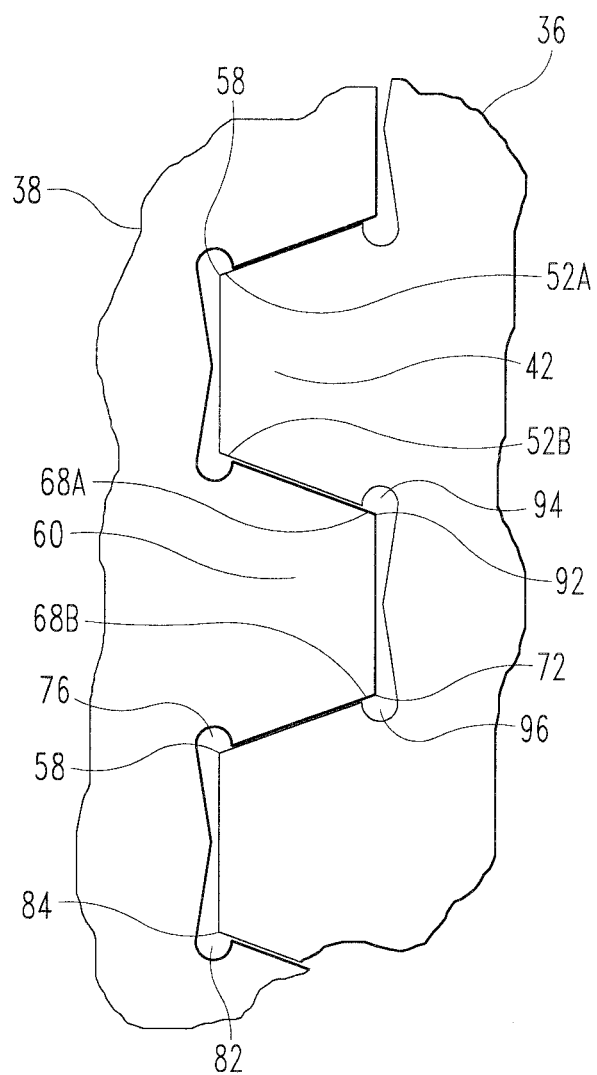
FIG. 4 depicts the driving side and driven side of the face coupling of FIG. 3 in engagement.

Referring now to FIGS. 2-4, lift engine system 10 includes a plurality of components that are coupled together and transmit torque from one of the components to the other. Schematically illustrated are a component 30 and a component 32. Components 30 and 32 are coupled together via a coupling 34. Coupling 34 transmits torque between component 30 and component 32. Components 30 and 32 may be, for example, turbine wheels, compressor disks, shafting system components, and other drive system components. In other embodiments, coupling 34 may be configured for use in any gas turbine engine or in any other type of machine.

Various schemes may be employed to couple machinery components such as components 30 and 32, including, for example, bolted joints, circumferential splines, and face couplings such as face splines. Coupling 34 is a face coupling. In one embodiment, coupling 34 is a face coupling in form of a face spline. In particular, coupling 34 of the present embodiment is a CURVIC® (The Gleason Works Corporation) coupling. Face splines, such as CURVIC® couplings, employ, on both the driving side of the coupling and the driven side of the coupling component, a plurality of teeth that are circumferentially spaced apart. The teeth of each component are positioned within the spaces between the teeth of the mating component. The teeth of each component engage adjacent teeth of the other component to transmit torque. In one form, the mating teeth function as pilots, centering the drive side and the driven side of the coupling relative to each other. In other embodiments, the mating teeth may not be configured to perform a centering function.

Coupling 34 includes a driving side 36 and a driven side 38. Coupling 34 is structured to transmit a torque load from component 30 to component 32. In one form, driving side 36 integral with component 30, and driven side 38 is integral with component 32. In other forms, driving side 36 and driven side 38 may be made separately from respective components 30 and 32 and subsequently attached or joined thereto.

Components 30 and 32 may be clamped together at assembly in order to ensure that driving side 36 and driven side 38 remain in full engagement during all loading conditions. For example, in one form, a tie shaft system 40 is employed as a clamping mechanism that transmits an axial clamping load through component 30, coupling 34 and component 32. The clamp load retains driving side 36 in engagement with driven side 38, which may ensure adequate torque transmission through coupling 34, as well as centering driving side 36 and driven side 38 relative to each other. In other embodiments, different clamping arrangements may be employed.

Driving side 36 of coupling 34 includes a plurality of teeth 42 extending axially away from component 30, and a corresponding plurality of spaces 44 between adjacent teeth 42. Teeth 42 are face spline teeth, in particular, curvic teeth. Teeth 42 are equally spaced in the circumferential direction, i.e., the direction indicated by bidirectional arrow 46. Each tooth 42 is characterized in part by a tip 48, a root 50 and two flanks 52A and 52B. Tip 48 represents the axially outermost extent of each tooth 42 in the direction towards driven side 38. Root 50 is the base portion of each tooth 42. Each flank 52A, 52B extends between the tip 48 and root 50 of each tooth 42.

Each tooth 42 has a pressure surface located on one or both of the flanks that transmits the torque and is subject to Hertzian contact stresses resulting from therefrom. Depending on the clamp load, each flank may have such a pressure surface, for example, in response to the clamping forces imposed by tie shaft system 40, in addition to the torque load. Assuming a given tooth geometry, the location of the pressure surface on each tooth 42 depends on the direction of torque transfer, the magnitude of the torque, and the magnitude of the clamp load.

Neglecting the effects due to the clamp load, and assuming that driving side 36 transmits a torque in a direction 54 to driven side 38, each tooth 42 includes a pressure surface 56 disposed on flank 52A. If the torque were transmitted in the opposite direction, the pressure surface would be on flank 52B. The pressure surface is the portion of flank 52A that is in mating contact with a corresponding tooth on driven side 38. Flank 52A has a tip edge 58 adjacent to driving tooth pressure surface 56.

Driven side 38 includes a plurality of teeth 60 extending axially away from component 32, and a corresponding plurality of spaces 62 between adjacent teeth 60. Teeth 60 are face spline teeth, in particular, curvic teeth. Teeth 60 are equally spaced around driven side 38 in the circumferential direction, i.e., the direction indicated by bidirectional arrow 46. Each tooth 60 is characterized in part by a tip 64, a root 66 and two flanks 68A and 68B. Tip 64 represents the axially outermost extent of each tooth 60 in the direction towards driving side 36. Root 66 is the base portion of each tooth 60. Each flank 68A, 68B extends between the tip 64 and root 66 of each tooth 60.

Each tooth 60 has a pressure surface located on one or both of the flanks that transmits the torque and is subject to Hertzian contact stresses resulting from therefrom. Depending on the clamp load, each flank may have a pressure surface, for example, in response to the clamping forces imposed by tie shaft system 40, in addition to the torque load. Assuming a given tooth geometry, the location of the pressure surface on each tooth 60 depends on the clamp load and the direction of torque transfer, the magnitude of the torque, and the magnitude of the clamp load.

Neglecting the effects due to the clamp load, and assuming that driving side 36 transmits a torque in direction 54 to driven side 38, each tooth 60 includes a driving tooth pressure surface 70 disposed on flank 68B. If the torque were transmitted in the opposite direction, the pressure surface would be on flank 68A. The pressure surface is the portion of flank 68B that is in mating contact with a corresponding tooth on driving side 36. Each tooth 60 has a tip edge 72 adjacent to driven tooth pressure surface 70 that may experience high stresses during service. Driving teeth 42 and driven teeth 60 are structured to cooperate to transmit the torque load from component 30 to component 32 via each driving tooth pressure surface 56 acting against an adjacent driven tooth pressure surface 70.

In order to reduce peak stresses resulting from edge effects due to contact between tip edge 58 of each tooth 42 and flank 68B of each adjacent tooth 60, each driven tooth 60 includes on flank 68B a root transition 74 that is structured to prevent each driving tooth tip edge 58 from contacting flank 68B of the adjacent driven tooth 60.

In one form, root transition 74 is a root recess 76 that is positioned on and undercuts flank 68B of tooth 60 at a location opposite to tip edge 58 of adjacent tooth 42. In other embodiments, other types of root transitions may be employed to prevent contact between tip edge 58 and flank 68B. In one form, root recess 76 is in the form of a fillet radius 78, although different recess geometries may be employed in other embodiments.

An additional root transition may be employed on each tooth 60 at flank 68A, e.g., depending on the stress field and/or in applications where coupling 34 is intended to transmit torque in both directions. For example, a root transition 80 in the form of a root recess 82 may be positioned on flank 68A and may undercut flank 68A of tooth 60 at a location opposite to a tip edge 84 of adjacent tooth 42. In other embodiments, other types of root transitions may be employed to prevent contact between tip edge 84 and flank 68A. In one form, root recess 82 is in the form of a fillet radius 86, although different recess geometries may be employed in other embodiments.

Similarly, teeth 42 may employ root transitions on one or both of flanks 52A and 52B in order to reduce peak stresses resulting from edge effects due to contact between tip edges of teeth 60 contacting adjacent flanks 52A and 52B. For example, each driving tooth 42 may include on flanks 52A and 52B root transition 88 and 90 that are structured to prevent each respective driving tooth tip edge 72 and 92 from contacting the respective flank 52A and 52B of the adjacent driven tooth 42.

In one form, root transitions 88 and 90 are in the form of root recesses 94 and 96 that are positioned on and undercut respective flanks 52A and 52B of tooth 42 at a location opposite to respective tip edges 72 and 92 of adjacent teeth 60. In other embodiments, other types of root transitions may be employed to prevent contact between tip edges 72 and 92 and respective flanks 52A and 52B. In one form, root recesses 94 and 96 are in the form of fillet radii 98 and 100, although different recess geometries may be employed in other embodiments.

FIG. 4 illustrates driving side 36 in engagement with driven side 38. It is noted that, by virtue of root transitions in the form of root recesses 76, 82, 94 and 96, tooth tip edges 58, 72, 84 and 92 do not contact the flank portions of the adjacent teeth. Although the present embodiment includes root transitions in the form of recesses at the base of each side of each tooth on driving side 36 and driven side of coupling 34, it will be it will be understood that the root transitions described herein may be used at a lesser number of locations in other embodiments, e.g., on only one side of the teeth of one or both of driving side 36 and driven side 38.

One embodiment of the present invention is a gas turbine engine which may include a first component, a second component, and a face coupling structured to transmit a torque load from the first component to the second component. The face coupling may include a plurality of driving teeth extending axially from the first component. Each driving tooth may have a driving tooth pressure surface and a driving tooth tip edge adjacent to the driving tooth pressure surface. The face coupling may also include a plurality of driven teeth extending axially from the second component. Each driven tooth may have a driven tooth pressure surface. The plurality of driving teeth and the plurality of driven teeth may be structured to cooperate to transmit the torque load from the first component to the second component via the driving tooth pressure surfaces acting against the driven tooth pressure surfaces. The plurality of driven teeth may include a first root transition structured to prevent the driving tooth tip edge from contacting an adjacent driven tooth.

In one refinement of the embodiment the root transition may include a root recess positioned opposite the driving tooth tip edge.

In another refinement of the embodiment the root recess may include a fillet radius.

In another refinement of the embodiment each driven tooth may have a driven tooth tip edge adjacent to the driven tooth pressure surface. The plurality of driving teeth may include a second root transition structured to prevent the driven tooth tip edge from contacting an adjacent driving tooth.

In another refinement of the embodiment the root transition may include a root recess positioned opposite the driven tooth pressure surface tip edge.

In another refinement of the embodiment the root recess may include a fillet radius.

In another refinement of the embodiment the face coupling may be a face spline. The plurality of driving teeth and the plurality of driven teeth may be face spline teeth.

In another refinement of the embodiment the face coupling may be a curvic coupling.

Another embodiment of the present invention is a face coupling a face structured to transmit a torque load from a first component to a second component. The face coupling may include a plurality of driving teeth extending axially from the first component. Each driving tooth may have a driving tooth pressure surface and a driving tooth tip edge adjacent to the driving tooth pressure surface. The face coupling may also include a plurality of driven teeth extending axially from the second component. Each driven tooth may have a driven tooth pressure surface. The plurality of driving teeth and the plurality of driven teeth may be structured to cooperate to transmit the torque load from the first component to the second component via the driving tooth pressure surfaces acting against the driven tooth pressure surfaces. The plurality of driven teeth may include a first root transition structured to prevent the driving tooth tip edge from contacting an adjacent driven tooth.

In one refinement of the embodiment the root transition may include a root recess positioned opposite the driving tooth pressure surface tip edge.

In another refinement of the embodiment the root recess may include a fillet radius.

In another refinement of the embodiment each driven tooth may have a driven tooth tip edge adjacent to the driven tooth pressure surface. The plurality of driving teeth may include a second root transition structured to prevent the driven tooth tip edge from contacting an adjacent driving tooth.

In another refinement of the embodiment the root transition may include a root recess positioned opposite the driven tooth tip edge.

In another refinement of the embodiment the root recess may include a fillet radius.

In another refinement of the embodiment the face coupling may be a face spline. The plurality of driving teeth and the plurality of driven teeth may be face spline teeth.

In another refinement of the embodiment the face coupling may be a curvic coupling.

Another embodiment of the present invention is a face coupling structured to transmit a torque load from a first component to a second component. The face coupling may include a means for transmitting torque from the first component. The means for transmitting may be coupled to the first component. The coupling may also include a means for receiving torque from the means for transmitting. The means for receiving may be coupled to the second component. The face coupling may also include a first means for preventing a tip edge of the means for transmitting from contacting the means for receiving.

In one refinement of the embodiment the first means for preventing may include a root recess.

In another refinement of the embodiment the face coupling may include a second means for preventing a tip edge of the means for receiving from contacting the means for transmitting.

In another refinement of the embodiment the second means for preventing may include a root recess.

In another refinement of the embodiment the means for transmitting may be integral with the first component. The means for receiving may be integral with the second component.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a first component;
   a second component; and
   a face coupling structured to transmit a torque load from said first component to said second component, said face coupling including:
   a plurality of driving teeth extending axially from said first component, each driving tooth having a driving tooth pressure surface and a driving tooth tip edge adjacent to the driving tooth pressure surface; and
   a plurality of driven teeth extending axially from said second component, each driven tooth having a driven tooth pressure surface,
   wherein said plurality of driving teeth and said plurality of driven teeth are structured to cooperate to transmit said torque load from said first component to said second component via driving tooth pressure surfaces acting against driven tooth pressure surfaces; and
   wherein said plurality of driven teeth include a first root transition structured to prevent said driving tooth tip edge from contacting an adjacent driven tooth;

wherein said first root transition includes a root recess having an undercut in the flank of said adjacent driven tooth.

2. The gas turbine engine of claim 1, wherein said root recess is positioned opposite said driving tooth tip edge.

3. The gas turbine engine of claim 2, wherein said root recess includes a fillet radius.

4. The gas turbine engine of claim 1, wherein each driven tooth has a driven tooth tip edge adjacent to said driven tooth pressure surface, and wherein said plurality of driving teeth include a second root transition structured to prevent said driven tooth tip edge from contacting an adjacent driving tooth.

5. The gas turbine engine of claim 4, wherein said second root transition includes a root recess positioned opposite said driven tooth tip edge.

6. The gas turbine engine of claim 5, wherein said root recess includes a fillet radius.

7. The gas turbine engine of claim 6, wherein said face coupling is a curvic coupling.

8. The gas turbine engine of claim 1, wherein said face coupling is a face spline, and wherein said plurality of driving teeth and said plurality of driven teeth are face spline teeth.

9. A face coupling structured to transmit a torque load from a first component to a second component, said face coupling comprising:
- a plurality of driving teeth extending axially from said first component, each driving tooth having a driving tooth pressure surface and a driving tooth tip edge adjacent to the driving tooth pressure surface; and
- a plurality of driven teeth extending axially from said second component, each driven tooth having a driven tooth pressure surface,
- wherein said plurality of driving teeth and said plurality of driven teeth are structured to cooperate to transmit said torque load from said first component to said second component via the driving tooth pressure surfaces acting against the driven tooth pressure surfaces; and
- wherein said plurality of driven teeth include a first root transition structured to prevent said driving tooth tip edge from contacting an adjacent driven tooth;
- wherein said first root transition includes a root recess having an undercut in the flank of said adjacent driven tooth.

10. The face coupling of claim 9, wherein said root recess is positioned opposite said driving tooth tip edge.

11. The face coupling of claim 10, wherein said root recess includes a fillet radius.

12. The face coupling of claim 9, wherein each driven tooth has a driven tooth tip edge adjacent to said driven tooth pressure surface, and wherein said plurality of driving teeth include a second root transition structured to prevent said driven tooth tip edge from contacting an adjacent driving tooth.

13. The face coupling of claim 12, wherein said second root transition includes a root recess positioned opposite said driven tooth tip edge.

14. The face coupling of claim 13, wherein said root recess includes a fillet radius.

15. The face coupling of claim 9, wherein said face coupling is a face spline, and wherein said plurality of driving teeth and said plurality of driven teeth are face spline teeth.

16. The face coupling of claim 9, wherein said face coupling is a curvic coupling.

17. A face coupling structured to transmit a torque load from a first component to a second component, said face coupling comprising:
- means for transmitting torque from said first component, wherein said means for transmitting is coupled to said first component;
- means for receiving torque from said means for transmitting, wherein said means for receiving is coupled to said second component; and
- first means for preventing a tip edge of said means for transmitting from contacting said means for receiving;
- wherein said means for transmitting torque includes a driving tooth; wherein said means for receiving torque includes a driven tooth disposed adjacent to said driving tooth during the transmitting and the receiving of the torque; wherein said first means for preventing includes a root recess having an undercut in the flank of the adjacent driven tooth; and wherein said root recess is configured to prevent a tip edge of said driving tooth from contacting said adjacent driven tooth.

18. The face coupling of claim 17, wherein said means for transmitting is integral with said first component, and wherein said means for receiving is integral with said second component.

19. The face coupling of claim 17, further comprising second means for preventing a tip edge of said means for receiving from contacting said means for transmitting.

20. The face coupling of claim 19, wherein said second means for preventing includes a root recess.

* * * * *